June 24, 1947.  D. SILVERMAN ET AL  2,422,806
DRILL BIT PRESSURE GAUGE
Filed April 28, 1944

Inventors:
Daniel Silverman
Thomas Gilmartin
By Youart H. Kerslake
Attorney

Patented June 24, 1947

2,422,806

UNITED STATES PATENT OFFICE 2,422,806

DRILL BIT PRESSURE GAUGE

Daniel Silverman and Thomas Gilmartin, Tulsa, Okla., assignors to Stanolind Oil and Gas Company, Tulsa, Okla., a corporation of Delaware Application April 28, 1944, Serial No. 533,169

5 Claims. (Cl. 73—88)

The present invention relates to pressure gauges for determining the weight or pressure on the drill bit during drilling operations, and more particularly to a device for determining the pressure on the drill bit at a point near the bit so that the information obtained is more accurate and reliable than heretofore.

During the drilling of a well it is highly desirable to know the weight on the drill bit at the bottom of the bore hole. This information enables a straighter well bore to be drilled since excessive weight on the drill bit causes the drill stem to flex whereby drilling takes place at an angle to the vertical. On the other hand, sufficient weight for attaining maximum efficiency during the drilling operation is also essential. Also information regarding the weight on the drill bit is very useful in interpreting and correcting records of the rate of penetration of the drill bit as described, for instance, in application S. N. 516,116 filed on December 29, 1943, by Daniel Silverman and Robert W. Stuart. According to the present methods for determining the weight on a drill bit, the tensile stress in the supporting cables, travelling block hook, or kelly are measured. Since these measurements are made at the surface and at a great distance from the actual point at which the pressure on the bit is impressed and since it is known that the stress in the drill stem varies from top to bottom of the well due to travelling waves in the pipe, the measurements made at the surface according to the known methods are inaccurate and unreliable.

The system according to the present invention enables one to determine the weight or pressure on the drill bit at a point very close to the drill bit, so that variations caused by tension or compression of the drill stem, changes in mud density, etc., will not affect the measurements.

We propose to measure the weight on the drill bit by measuring the tensile or compressive stress in the drill collar at a point just above the drill bit.

Broadly, the present invention consists in varying the voltage of an electric signal in accordance with the stress in the drill collar, either tensile or compressive. The electric circuits and elements thereof for producing the signals are disposed in the well at a point near the drill bit and preferably are contained in the drill collar which connects the bottom of the drill stem with the drill bit. The signals which are caused by variations in the voltage of the electric current are transmitted to the surface and recorded in any conventional manner.

The essential features of the present invention will be more clearly understood by referring to the drawings which form a part of the present specification, and in which.

Figure 1:
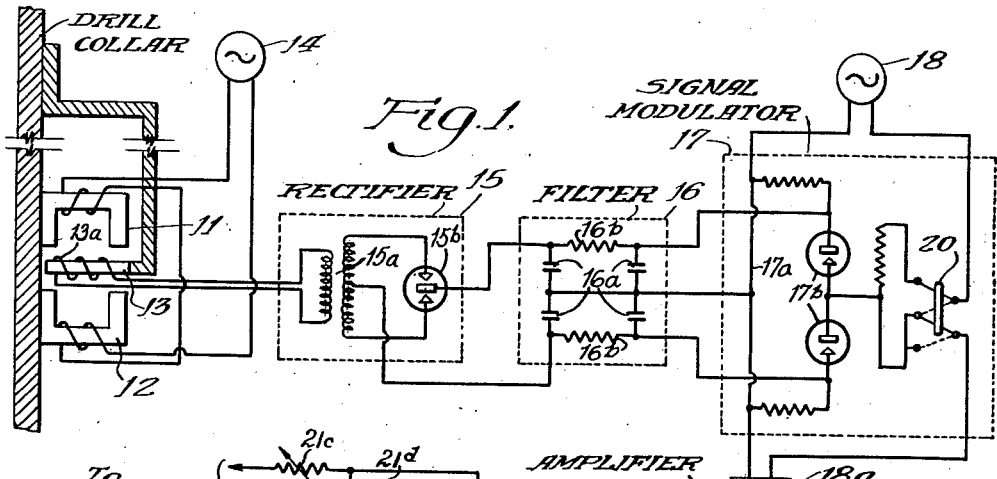
Figure 1 is a diagrammatic illustration of one system for determining the weight on the drill bit.

With reference to Figure 1 a strain gauge consisting of two strators 11 and 12 is rigidly secured to the inside wall of a hollow section of the drill collar at a point above the drill bit. An armature 13 is disposed symmetrically between the stators, but is secured to the drill collar at a point considerably removed from the point of attachment of the stators. When the drill collar is subjected to varying longitudinal stresses, the armature 13 will move vertically with respect to the stators. Each of the stators 11 and 12 carries a winding which is connected in series with an alternator 14 so that the windings tend to induce opposite E. M. F.'s in the winding on the armature. The armature 13 carries a winding 13a which leads directly to rectifier 15. When the drill collar is subject to varying stresses and the armature moves nearer one or the other of the stators 11 and 12, a voltage will be generated in the armature winding 13a. The rectifier 15 which may be of any desired type, but which is illustrated in Figure 1 as a full wave type, converts the alternating current voltage from the armature 13 into direct current, the voltage of which is proportional to the voltage generated in the armature winding. The rectifier 15 comprises a step-up transformer 15a and a double plate diode 15b. Whereas full wave rectification would occur in rectifier 15, a half-wave rectifier may be used, if desired. The direct current is then passed through a filter 16, which contains condensers 16a in parallel and resistances 16b in series for smoothing out the direct current impulses from rectifier 15 and thence to a signal modulator 17 having a source of alternating current 18. The modulator is a variable L-type attenuator with a fixed series arm 17a and a pair of biased diodes 17b as a shunt arm, biased by the output of the rectifier 15. The modulator 17 is of the type shown at 14 in Figure 2 of U. S. Letters Patent 2,329,558, dated September 14, 1943.

If desired, a dry disk modulator such as a copper oxide or selenium modulator may be used. The output of the signal modulator 17 is an alternating current having voltage variations which are proportional to the original variations in voltage in armature 13a caused by variations in the stresses of the drill collar. The output of the modulator 17 is then passed through an amplifier 18a and then to toroidal transformer 19 so that the signals may be sent to the surface and there recorded in any conventional manner. Any other system can be used for conveying the signals from the drill collar to the surface, but we prefer to use a toroidal transformer of the type described and illustrated in U. S. Letters Patent 2,354,887 dated August 1, 1944 to Daniel Silverman and Robert E. Fearon.

According to Figure 1 the normal position of the armature 13 is midway between the stators, in which position there is zero voltage generated. When the armature moves upwards or downwards in response to increased tension or compression at the drill collar, the induced voltage increases and the output of filter 16 also increases, and the output of modulator 17 varies in the same manner. Consequently, a single reading of the signal picked up at the surface would not tell whether the stress in the drill collar is tension or compression. However, this can be determined very simply by raising the drill stem off bottom, in which case it is known that the drill collar is under tension, then by observing the recorder or indicator thereafter one can determine at a glance whether the stress is compression or tension and can determine very accurately when the neutral plane is at the position of the strain gauge, i. e. when there is neither compression nor tension in the drill collar at the strain gauge.

This system may be operated, if desired, by initially setting armature 13 suite close to one of the stators. In this case, a large A. C. voltage will be induced when the neutral plane is at the strain gauge. Variations in stress from compression to tension or vice versa, will change the magnitude of the induced voltage but the phase will not change, since it will not pass through a zero value. The rectified output of filter 16 in this case will show a continuous variation from a minimum to a maximum value or vice versa. When the neutral plane is at the strain gauge the indication at the surface would correspond to the predetermined value of D. C. voltage.

Since the value of the signals may vary while being transmitted to the surface due to attenuation, it is often desirable to transmit the signals alternately with a calibration signal. The calibration signal may be transmitted by intermittently operating switch 20 by any type of motor or the like (not shown). When the switch is in the position shown in Figure 1, the signals originating in armature 13 will be transmitted to the surface. However, when the switch 20 is pulled down so that the modulator is cut out of the system, a calibrating signal corresponding with the voltage of alternator 18 will be transmitted. By comparing the value of the calibration voltage with the voltage of the signals an accurate measurement of the stress in the drill collar may be obtained.

Figure 1A:
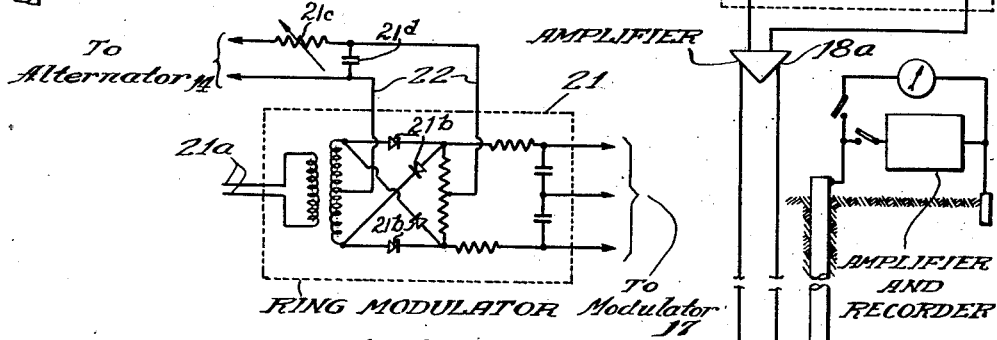
Figure 1a illustrates diagrammatically a modification of the system shown in Figure 1.

According to Figure 1a a ring modulator 21 may be used in place of the rectifier 15 and filter 16. This eliminates harmonics in the output of the armature coil. While any type of ring modulator may be used, the one illustrated in Figure 1a comprises the use of a group of four copper oxide rectifiers 21b. The leads 21a from armature 13 supply the signal input while leads 22 are connected through a variable resistance 21c and condenser 21d to alternator 14. The variable resistance 21c and condenser 21d constitute a means for shifting the phase of the alternator voltage so that the A. C. from alternator 14 can be adjusted to be in phase with the signal in leads 21a. The output of modulator 21 leads directly to the signal modulator 17 shown in Figure 1. Ring modulator 21 is of the type illustrated and described in the book, "Radio Direction Finders," 1944, by Donald S. Bond, pages 177 and 219. Also modulators of the type described in the article, "Copper oxide modulators in carrier telephone systems," by R. S. Caruthers, appearing in the "Bell System Technical Journal," volume 18, 1939, at page 315, et seq., can be used.

The principal advantage to be derived from the use of a ring modulator as shown in Figure 1a resides in the fact that the system shown in Figure 1 will often produce harmonics either from alternator 14 or due to the iron structures constituting stators 11 and 12 and armature 13. Even at the position of best balance there is a certain amount of harmonic coming through the system which detracts from the sharpness of balance. When a ring modulator as shown in Figure 1a is used, only those frequencies present in the input voltage, which are the same as those of the oscillator 14, will be passed. All harmonic frequencies are rejected. A further advantage resides in the fact that the polarity of the output of modulator 17 indicates the phase of the current in aramature 13 so that the signals obtained at the surface will indicate directly whether the drill collar is under compression or tension.

Figures 2, 3:
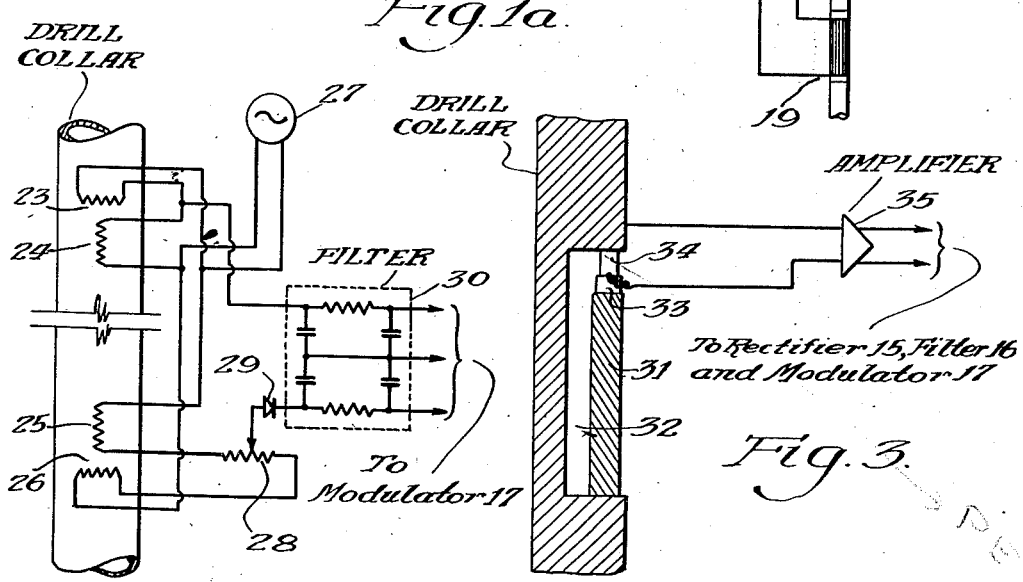
Figure 2 illustrates diagrammatically another system for determining the weight on the drill bit.
Figure 3 illustrates still another modification of the present invention.

Another modification of the present invention is illustrated in Figure 2. According to this system, it is possible to compensate automatically for temperature variations which might cause inaccurate signals to be transmitted when the stators and armature of Figure 1 are used. According to Figure 2 strain gauges 23, 24, 25 and 26 of the resistance type are used. These resistances are connected together to form a Wheatstone bridge. A source of alternating current 27 is connected as shown in the drawing and an adjustable resistance 28, for calibrating purposes, is also connected to the system. The output of the Wheatstone bridge is passed through a rectifier, indicated diagrammatically at 29 and then through a filter 30. The output of filter 30 is then passed to signal modulator 17 as shown in Figure 1. Resistances 24 and 25 will vary in accordance with variations in stress on the drill collar. However, when the ambient temperature increases or decreases the resistances 24 and 25 will undergo a change which is not caused by variations in stress on the drill collar. To compensate for these undesirable variations, resistances 23 and 26 are arranged so that variations due to changes in the temperature will be automatically compensated.

A device having some of the advantages of our invention is shown in Figure 3. In this figure the circuit shown acts to produce an indication of variations in compressive stresses at the drill bit as long as the drill is being rotated. A section of the drill collar adjacent to the bit is hollowed out or slotted at 32 to provide two opposite abutting faces. Between these two faces a post 31 of the same material as the drill collar, an insulator 33, and a piezo-electric crystal 34 are snugly mounted. The opposite faces of the piezo-electric crystal are electrically connected to an amplifier 35 which preferably is also located in a sealed, hollow chamber in the wall of the drill collar. The output of this amplifier is applied across a rectifier such as rectifier 15 shown in Figure 1, which, in turn, applies an input to filter 16 and signal modulator 17 as shown in Figure 1.

In operation, the static stress applied between the faces of the crystal 34 by the compression on the drill collar will give no alternating current out put which therefore supplies no output voltage from the rectifier 15. However, as soon as the drill is rotated against the formation, the drill string is subjected to varying compressive stresses in the form of jars or impacts which produce a varying alternating current output across the crystal and hence across the electrical leads. This varying signal is amplified by amplifier 35 and applied through the rectifier 15, filter 16, and signal modulator 17 to produce a varying current through the coil 19 which, in turn, transmits it to the surface for indication or recording. As soon as the drill collar is in tension the crystal 34 no longer makes contact with the drill collar, thus opening the circuit to the amplifier 35. It is seen that the device operates to produce a varying voltage as long as the drill collar is in compression and the drill bit is rotating against the formation thus producing a positive indication that drilling is taking place.

Although the present invention has been described with particular reference to the systems illustrated in the drawings, it will be understood that various modifications of the electrical system will occur to those skilled in the art and it is intended that such modifications as come within the scope of the appended claims be covered thereby.

Having now described our invention what we claim is:

1. A system for determining the pressure on a drill bit comprising a source of electric current, an electric strain gauge disposed adjacent said drill bit and responsive to variations in pressure on said bit and electrically connected to said source of current whereby signals are generated, a second source of electric current, means for modulating the current from said second source in accordance with said signals, means for transmitting this modulated current to the surface, and means at the surface for receiving and indicating said modulation current.

2. A system for determining the pressure on a drill bit comprising a source of electric current, an electric strain gauge disposed adjacent said drill bit and responsive to variations in pressure on said drill bit and electrically connected to said source of current whereby signals are generated, means for eliminating harmonics generated by said strain gauge, a second source of electric current, means for modulating the current from said second source in accordance with said signals, means for transmitting this modulated current to the surface, and means at the surface for receiving and indicating said modulated current.

3. A system for determining the pressure on a drill bit supported by a drill collar comprising an alternator, an electric strain gauge attached to said drill collar responsive to variations in stress on said drill collar and electrically connected to said alternator whereby signals are generated, means for rectifying the alternating current signals, a second alternator, means for modulating the current from said second alternator in accordance with said rectified signals, means for transmitting said modulated current to the surface, and means for receiving and for indicating said modulated current.

4. A system for determining the pressure on a drill bit comprising a strain gauge means adjacent the drill bit for producing electric signals indicative of the pressure on the drill bit, a source of electric current, means for modulating said current in accordance with said signals, means for transmitting said modulated current to the surface, and means for receiving and indicating said modulated current.

5. A system for determining the pressure on a drill bit supported by a drill collar comprising an alternator, an electric strain gauge attached to said drill collar responsive to variations in stress on said drill collar and electrically connected to said alternator whereby signals are generated, means for rectifying the alternating current signal, means for filtering said rectified signals, a second alternator, means for modulating the current from said second alternator in accordance with said rectified and filtered signals, means for transmitting said modulated current to the surface, and means at the surface for receiving and indicating said modulated current.

DANIEL SILVERMAN.
THOMAS GILMARTIN.

REFERENCES CITED

The following references are of record in the file of this patent:

UNITED STATES PATENTS

| Number | Name | Date |
|---|---|---|
| 2,183,078 | Kemler | Dec. 12, 1939 |
| 2,315,127 | Mounce | Mar. 30, 1943 |
| 2,283,429 | Ennis | May 19, 1942 |
| 1,930,905 | Nicolson | Oct. 17, 1933 |
| 2,346,838 | Haight | Apr. 18, 1944 |
| 2,344,642 | Ruge | Mar. 21, 1944 |
| 2,372,582 | Kean | Mar. 27, 1945 |
| 2,380,520 | Hassler | July 21, 1945 |

FOREIGN PATENTS

| Number | Country | Date |
|---|---|---|
| 116,045 | Australia | Apr. 16, 1941 |